United States Patent

Stumpe et al.

[11] Patent Number: 6,062,658
[45] Date of Patent: May 16, 2000

[54] METHOD AND APPARATUS FOR CONTROLLING THE BRAKE SYSTEM OF A VEHICLE

[75] Inventors: Werner Stumpe, Stuttgart; Martin Blanc, Knittlingen-Kleinvillars; Bernhard Schwendemann, Schorndorf; Juergen Wrede, Bietigheim-Bissingen; Matthias Horn, Hardheim; Andreas Seiche, Gerlingen; Jürgen Knott, Yokohama, all of Germany

[73] Assignee: Robert Bosch GmbH, Germany

[21] Appl. No.: 08/771,024

[22] Filed: Dec. 20, 1996

[30] Foreign Application Priority Data

Feb. 7, 1996 [DE] Germany .................. 196 04 391

[51] Int. Cl.⁷ ................................ B60T 8/60
[52] U.S. Cl. .......................... 303/155; 303/15
[58] Field of Search ................ 303/9.62, 9.69, 303/7, 15, 20, 152, 155, 186, 187, 188, 191, 198

[56] References Cited

U.S. PATENT DOCUMENTS

| | | | |
|---|---|---|---|
| 5,086,865 | 2/1992 | Tanaka et al. | 303/152 X |
| 5,303,986 | 4/1994 | Van De Motter | 303/3 |
| 5,460,434 | 10/1995 | Micke et al. | 303/15 X |
| 5,516,200 | 5/1996 | Tezuka et al. | 303/7 |

FOREIGN PATENT DOCUMENTS

WO93/18949  9/1993  WIPO .

*Primary Examiner*—Robert J. Oberleitner
*Assistant Examiner*—Robert A. Siconolfi
*Attorney, Agent, or Firm*—Fulbright & Jaworski, LLP.

[57] ABSTRACT

In a vehicle having a duty brake and a sustained-action brake (retarder), the actual braking moment produced by the sustained-action brake, as well as the braking command of the driver, are taken into consideration in the electrically controlled adjustment of the duty brake.

15 Claims, 5 Drawing Sheets

METHOD AND APPARATUS FOR CONTROLLING THE BRAKE SYSTEM OF A VEHICLE

BACKGROUND OF THE INVENTION

The invention pertains to a method and to an apparatus for controlling the brake system of a vehicle having an electrically controlled duty brake and an electrically controlled sustained action brake (e.g., a retarder), both of which are adjusted as a function of the driver's braking command.

A method and an apparatus of this type are known from, for example, U.S. Pat. No. 5,303,986. This patent describes a control for the brake system of a vehicle in which both the duty brakes and a sustained-action brake (e.g., retarder, some type of motor brake, etc.) are controlled electrically. As a function of the braking command derived from the actuation of the brake pedal and possibly as a function of the axle load of the vehicle, desired settings are formed both for the duty brake and also for the retarder to implement the braking command. The desired setting for the duty brake is a function of the difference between the braking command and the desired setting for the retarder. Because of the exclusive use of desired values to form the desired settings, this procedure can lead to unsatisfactory braking behavior. The desired setting for the retarder can differ significantly from the actual static value, because the achievable braking moment of the retarder depends on the retarder's operating status (e.g., a thermal overload in the case of a hydrodynamic retarder). Under dynamic operating conditions, furthermore, it can also lead to a delay in the increase in the braking action, which is perceived as unpleasant by the driver.

SUMMARY OF THE INVENTION

The object of the invention is to improve the control of the brake system of a vehicle with a duty brake and a sustained-action brake.

This is achieved by adjusting the duty brake as a function of the actual braking behavior of the retarder as well as the driver's command.

As a result, the braking behavior of a brake system with a duty brake and a sustained-action brake (e.g., a retarder) can be significantly improved under both static and dynamic operating conditions.

It is advantageous in particular that, through consideration of the braking action actually produced by the retarder in the setting of the duty brake, the driver's braking command can be accurately converted into a braking action.

The delayed response of the retarder is corrected by a dynamic correction of the setting of the duty brake, so that, for the driver, the dynamic braking behavior which is achieved is the same as that of conventional brake systems. This dynamic correction also prevents the brake linings from becoming glazed.

It also advantageous that, in certain braking situations such as panic braking, the retarder cannot be turned on or off.

It is especially advantageous that different priorities can be assigned, depending on the type of braking. In the case of light braking, for example, priority can be given to uniform reduction of lining wear with consideration of the braking action of the retarder at all axles. In the case of heavy braking, priority can be given to the distribution of the braking force, with the braking action of the retarder being taken into consideration only at the axle on which the retarder acts (usually the rear axle).

In this context, the braking action of the retarder can also be taken into consideration in the control of the duty brake system of a trailer. In this way, it is possible for the overall braking behavior of the vehicle or of the vehicle combination to be coordinated.

Limit values can be specified for the braking action produced by the retarder. As a result, the commands which the driver gives to the retarder by means of the hand lever can be limited by the electronic control unit controlling the brake system, which provides a further improvement in the braking behavior of the vehicle.

Additional advantages can be derived from the following description of exemplary embodiments.

DESCRIPTION OF THE EXEMPLARY EMBODIMENTS

Figure 1:
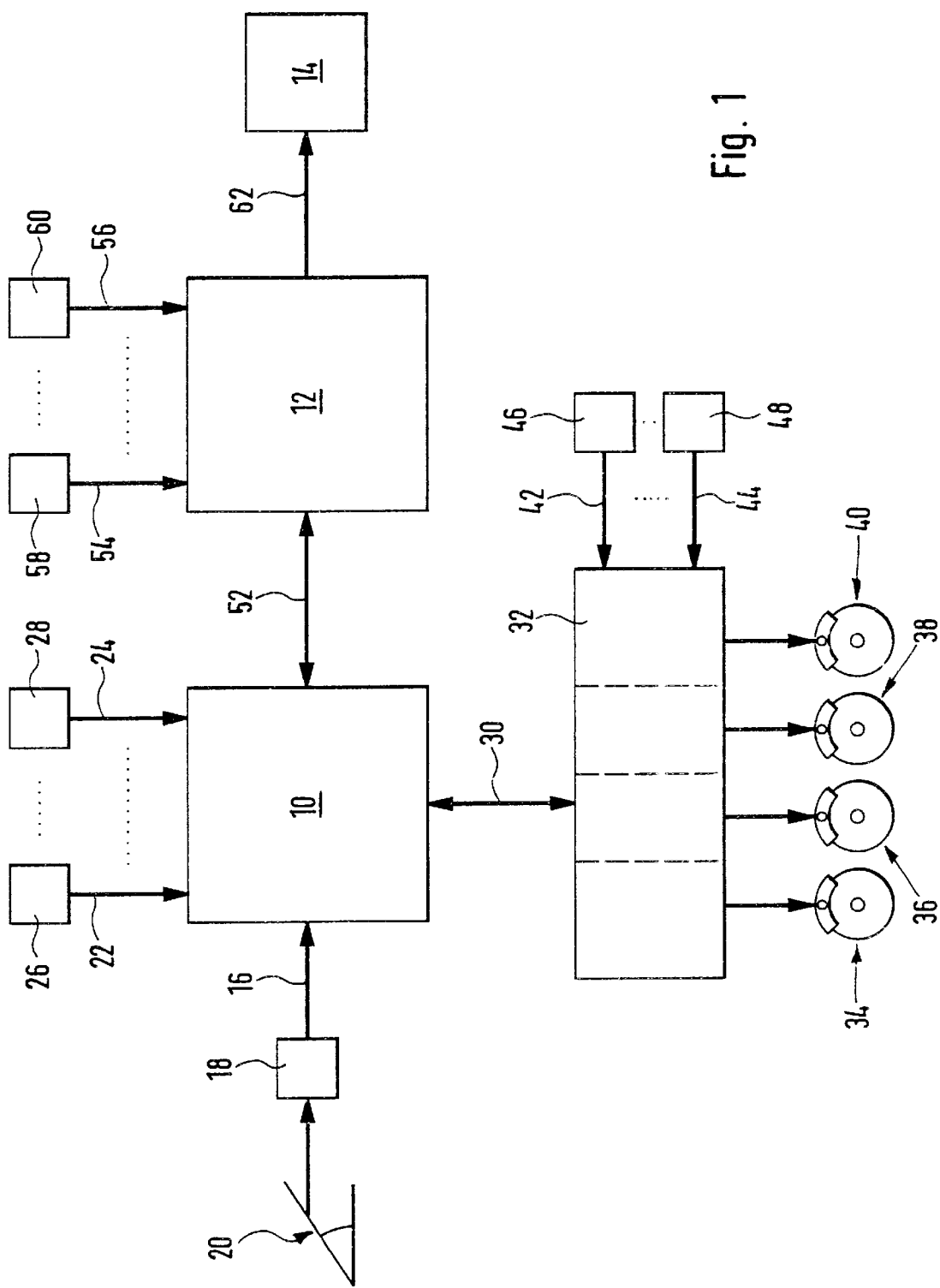
FIG. 1 shows an overall circuit diagram of the control of the brake system of a vehicle with duty brake and retarder.

FIG. 1 shows a functional circuit diagram of a control system for controlling the brake system of a vehicle equipped with a duty brake and a retarder. A first control unit 10 for controlling the duty brake and the retarder and a second control unit 12 for controlling retarder 14 are provided. Actuation signals are sent to control unit 10 over an input line 16 from a measuring device 18, which detects the actuation of a brake pedal 20. Operating variables of the brake system or of the vehicle are also sent to control unit 10 from measuring devices 26–28 over input lines 22–24. Operating variables such as these include, for example, one or more axle load signals, vehicle velocity signals, etc. Control unit 10 is connected by a communications link 30, such as a CAN bus, to one or more control units 32 for controlling the brakes 34, 36, 38, 40 of the wheels of the vehicle. Operating variables of the brakes such as wheel speeds, brake lining wear values, etc. are sent to this control unit or these control from measuring devices 46–48 units over input lines 42–44. Control unit 10, furthermore, is also connected by means of another communications link 52, which can also be part of the CAN bus system of the vehicle, to control unit 12 for controlling retarder 14. The operating variables required for retarder control are sent as input to this control unit from measuring devices 58–60 over input lines 54–56. Operating variables such as these include the position of an operating lever which controls the retarder, the retarder temperature, the rotational speed of the retarder, pressure signals from a hydrodynamic retarder, etc. Control unit 12 controls retarder 14 over output line 62; in the normal case, the retarder acts only on one axle of the vehicle, preferably the rear axle.

In a preferred exemplary embodiment, desired settings for the wheel brakes and the retarder are formed in control unit 10 on the basis of the actuation signal or the braking command derived therefrom under consideration of additional operating variables such as, for example, the axle load of the vehicle according to fixed characteristic curves or diagrams. In a preferred exemplary embodiment of an electropneumatic brake system, these values represent desired brake pressures for the wheel brakes and desired braking moments for the retarder. In other exemplary embodiments, desired braking moments, desired braking forces, desired braking powers, desired wheel speeds, desired wheel slips, desired deceleration values, etc., are formed instead of the desired pressures; or desired pressures, desired braking forces, desired brake powers etc., are formed instead of the desired braking moments.

The desired settings sent over communications link 30 to the control unit or control units 32 for the wheel brakes 34, 36, 38, 40 are actualized by these units by way of, for example, automatic control circuits (automatic pressure control circuits in the case of desired pressures). The tendency of any one of the individual wheels to lock is recognized on the basis of its speed behavior; the braking force exerted on this wheel brake is reduced accordingly; and status information on the intervention by the ABS controller is fed back to control unit 10. In addition to the desired setting for the retarder, a limit value for the braking moment (force, etc.) generated by the retarder is also formed as a function of the ABS status of the vehicle and/or the vehicle's velocity. As a result, it is possible to specify the maximum amount of braking moment which the retarder is allowed to produce. Any hand lever requirements going beyond this value are therefore limited, so that the function of the brake system is improved during ABS control and at the vehicle velocities in question. The retarder control unit 12 transmits in the opposite direction the desired value which it supposed to actualize (the transmitted braking moment value, the limit value, the hand lever command, or the achievable braking moment as a function of the operating status of the retarder) and the actual braking moment in fact produced (force, action, power, etc.), determined in accordance with preprogrammed characteristic diagrams and additional operating variables.

In addition to the preferred exemplary embodiment of an electropneumatic brake system, the invention can also be used in conjunction with electrohydraulic or electromechanical brake systems.

Figure 2:
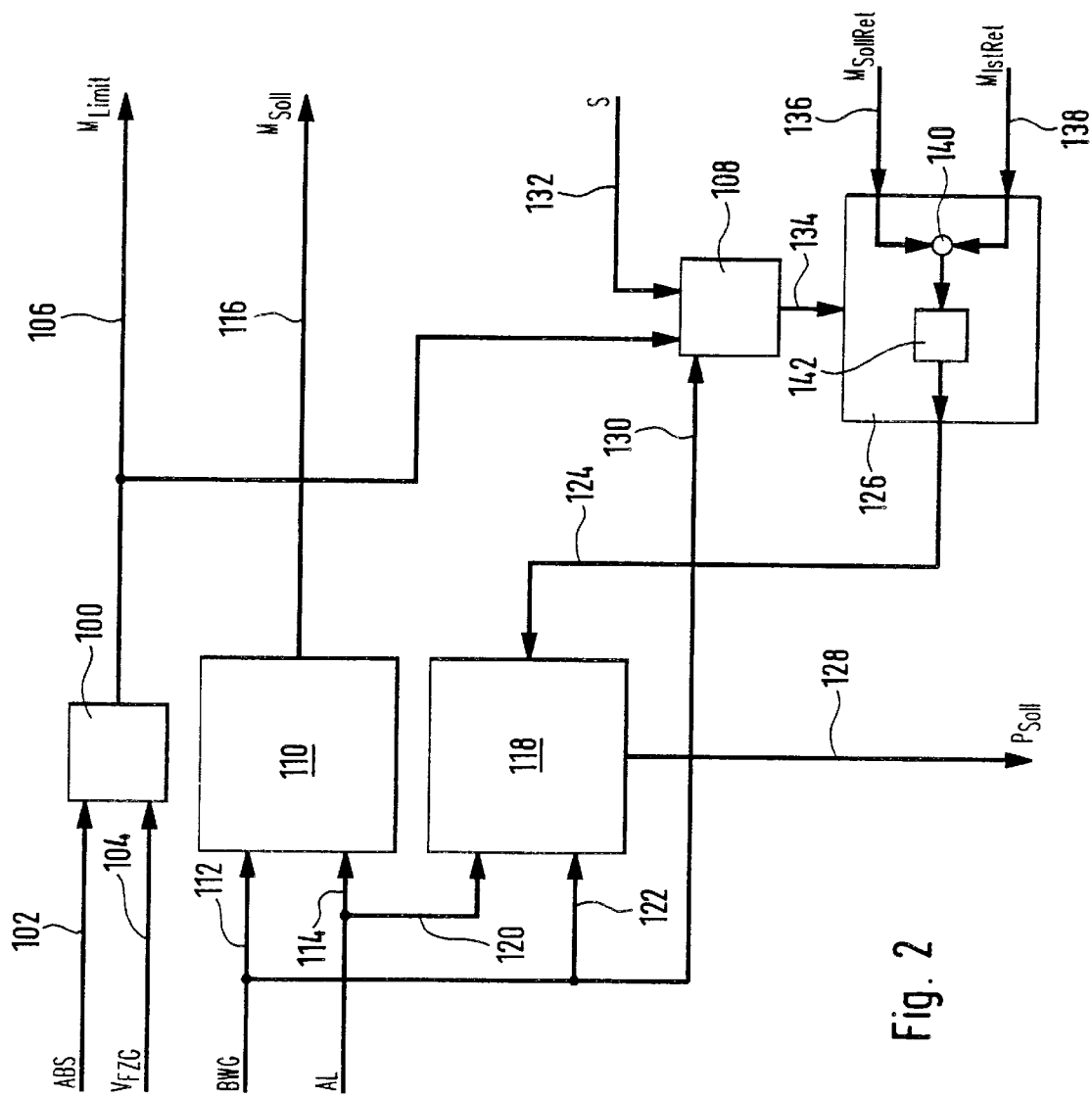
FIG. 2 shows a block circuit diagram of the control unit controlling the duty brake and the retarder.

FIG. 2 shows a functional circuit diagram which represents a program running on a microcomputer in a preferred exemplary embodiment. The input and output data shown are sent over the communications links and input/output lines shown in Figure.

In the preferred exemplary embodiment, the ABS status of the antilock controller is sent to a first characteristic diagram or a first table 100 over a connection 102, and the vehicle velocity $V_{FZG}$ is transmitted over a connection 104. Output 106 of the characteristic diagram or table 100, carrying the limit braking moment $M_{Limit}$, leads to the retarder and to a release unit 108. In addition, a second characteristic diagram 110 is provided, to which the actuation signal BWG of the brake pedal, i.e., the driver's braking command BWG, is sent over line 112, and, in an exemplary embodiment, to which at least one axle load measurement value AL of the vehicle, which can also be absent in other exemplary embodiments, is sent over line 114. Output 116 of characteristic diagram 110 carries the desired braking moment $M_{soll}$ to the retarder. A line 120 proceeding from line 114 and a line 122 leading from line 112 are also connected to a third characteristic diagram 118. A line 124, which is the output of the characteristic curve or characteristic diagram 126, is also sent to this characteristic diagram 118. Output 128 of characteristic diagram 118 leads to the control unit or control units for the wheel brakes. In addition to the inputs already cited, a line 130 leading from connection 122 and a line 132 from the retarder, which transmits its status, are connected to release unit 108. Output 134 of release unit 108 is connected to characteristic diagram 126. Desired moment $M_{sollRet}$ actually to be produced is sent to this characteristic diagram from the retarder over a line 136, and the actual moment $M_{IstRet}$ in fact produced is sent over line 138. In characteristic diagram 126, these two values are subtracted at a junction point 140, and an output value, calculated as a function of the difference between the desired moment and the actual moment, is determined as part of a characteristic curve 142.

Figure 4:
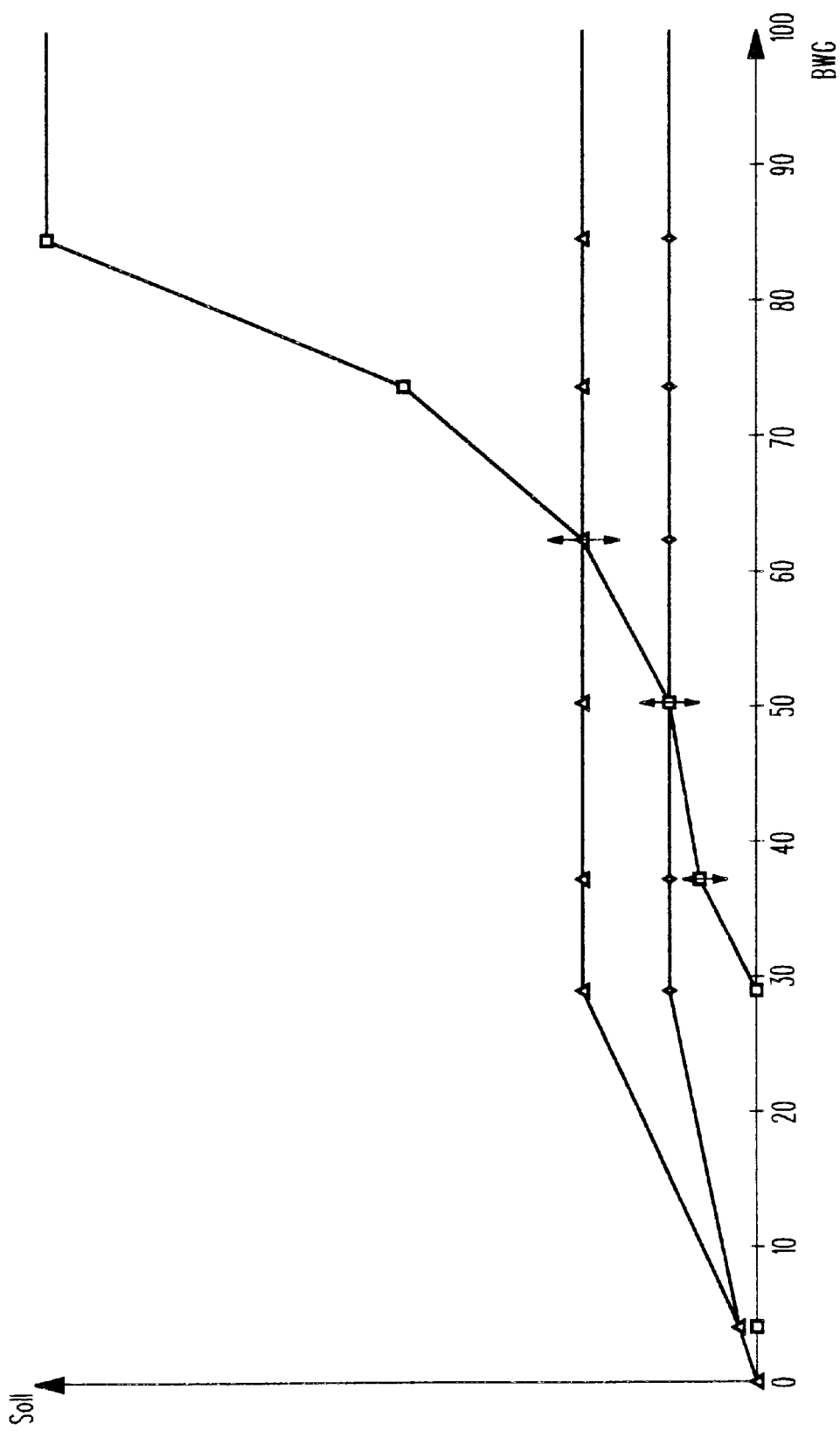
FIG. 4 shows an example of the characteristic curves used in a preferred exemplary embodiment for the control of the duty brake and the retarder.

In a preferred exemplary embodiment, the desired settings for the duty brake and for the retarder are determined in characteristic diagrams 110, 118 on the basis of the actuation signal BWG of the brake pedal and possibly also of at least one axle load signal AL according to predetermined characteristics curves, which are shown on the basis of an example in FIG. 4.

In FIG. 4, the actuation signal BWG is plotted on the horizontal axis, which goes from 0% (released pedal) to 100% (fully depressed pedal). The associated desired settings (e.g., desired pressure value for the duty brake, desired moment for the retarder) are plotted on the vertical axis. A first characteristic curve (diamonds) shows the course of the desired moment versus the actuation signal for the retarder in the case of an unloaded vehicle; a second characteristic curve (triangles) this relationship for a fully loaded vehicle. In addition, the course of the desired values for a certain load state is plotted versus the actuation signal for the duty brake (squares). For another load state of the vehicle, a corresponding characteristic curve is specified for the desired pressure. Accordingly, for a given actuation signal, corresponding desired values are read from the characteristic curves, depending on the axle load of the vehicle; in the case of loaded vehicles, intermediate values are determined by interpolation between the two characteristic curves for the unloaded and the fully loaded vehicle. The desired settings determined in this way are transmitted over the appropriate communications links to the control units for the duty brakes and fur the retarder.

To prevent the retarder from producing too much braking moment in certain operating situations, a braking moment limit value for the retarder is formed in the preferred exemplary embodiment in characteristic diagram 100 and transmitted to the retarder in these braking situations. Operating situations of this type include the times during which the antilock controller is operating and those during which the vehicle is traveling in certain velocity ranges. Corresponding signals are sent to characteristic diagram 100, in which a limit moment value has been stored for the operating situation or as a function of the operating variable; this limit value is then transmitted to the retarder over the communications link. Another operating state which could lead to the specifying of limit moments for the retarder is that in which the vehicle is travelling around a curve. As a result, the retarder is prevented from producing too much braking moment during times when the antilock controller is working, and the rear wheels are thus prevented from locking as a result of excessive retarder moment. In certain vehicle velocity ranges, furthermore, or when the vehicle is traveling around a curve, the stability of the vehicle can be improved, because in these operating situations the ideal brake pressure distribution of the duty brake can be used.

For optimum braking behavior, the braking action produced by the retarder is taken into consideration in the control of the duty brake in both static and dynamic operating situations. For this purpose, the retarder or the retarder control unit feeds the desired braking moment which it is to produce (the desired braking moment or the limit braking moment) and the current braking moment actually being produced back to control unit 10. The actual moment is estimated in the retarder control unit on the basis of the variables available there. So that the retarder braking moment can be taken into consideration, the characteristic curve which plots the desired brake pressures as a function of the driver's command is modified as a function of the braking moment of the retarder or of the difference between the desired braking moment to be produced and the actual braking moment and possibly as a function of any additional values which may have been specified. The desired braking moment to be produced by the retarder and transmitted by it, and/or the actual braking moment which was fed back, information on the braking conditions such as information on panic braking, information on the operating state of the retarder (e.g., active, not active), and/or information on whether or not an operating state is present for limiting the braking moment of the retarder enter into the modification.

On the basis of this information, offset values are determined, by means of which the characteristic curve for the desired braking pressure values are modified. These offset values preferably act on the support points of the characteristic curve and thus provide both a static and a dynamic correction of the characteristic curve and thus of the desired pressures to be produced by the duty brakes in accordance with the braking behavior of the retarder. The offset values can be formed for only a single axle of the combination vehicle, i.e., the axle on which the retarder acts (e.g., the rear axle), for all axles of the combination, or even for one or more axles of a trailer. The desired pressure values for the duty brake are determined from the characteristic curve modified by the offset values as a function of the braking command of the driver (as a function of load) and transmitted to the control unit or control units for the wheel brakes over the communications link.

It is especially advantageous that the braking pressure offsets are determined dynamically, which means that they can compensate for any possible delay in the buildup or release of the retarder braking moment. In the preferred exemplary embodiment, therefore, the difference between the desired braking moment to be actualized and the actual braking moment of the retarder in fact produced is determined. On the basis of this braking moment difference, a characteristic curve or a table is used to determine the dynamic braking pressure offset for one or more axles. The dynamic braking pressure offsets are also effective at preventing the brake linings from becoming glazed.

The braking pressure offsets are preferably determined only in certain operating situations. In a preferred exemplary embodiment, the braking pressure offsets are not determined in a state when so-called panic braking is occurring, i.e., when the driver is stepping on the pedal very quickly; in a state when the retarder braking moment is being limited; or when status information concerning an unusual operating state, especially a state in which there is a defect in the retarder, has been received. These operating states are detected in release block 108, and when at least one of these operating states is present, the offset determination process is interrupted.

FIG. 4 uses vertical double arrows to show the modification of the braking pressure characteristic curve as a function of the retarder braking behavior.

Figure 3:
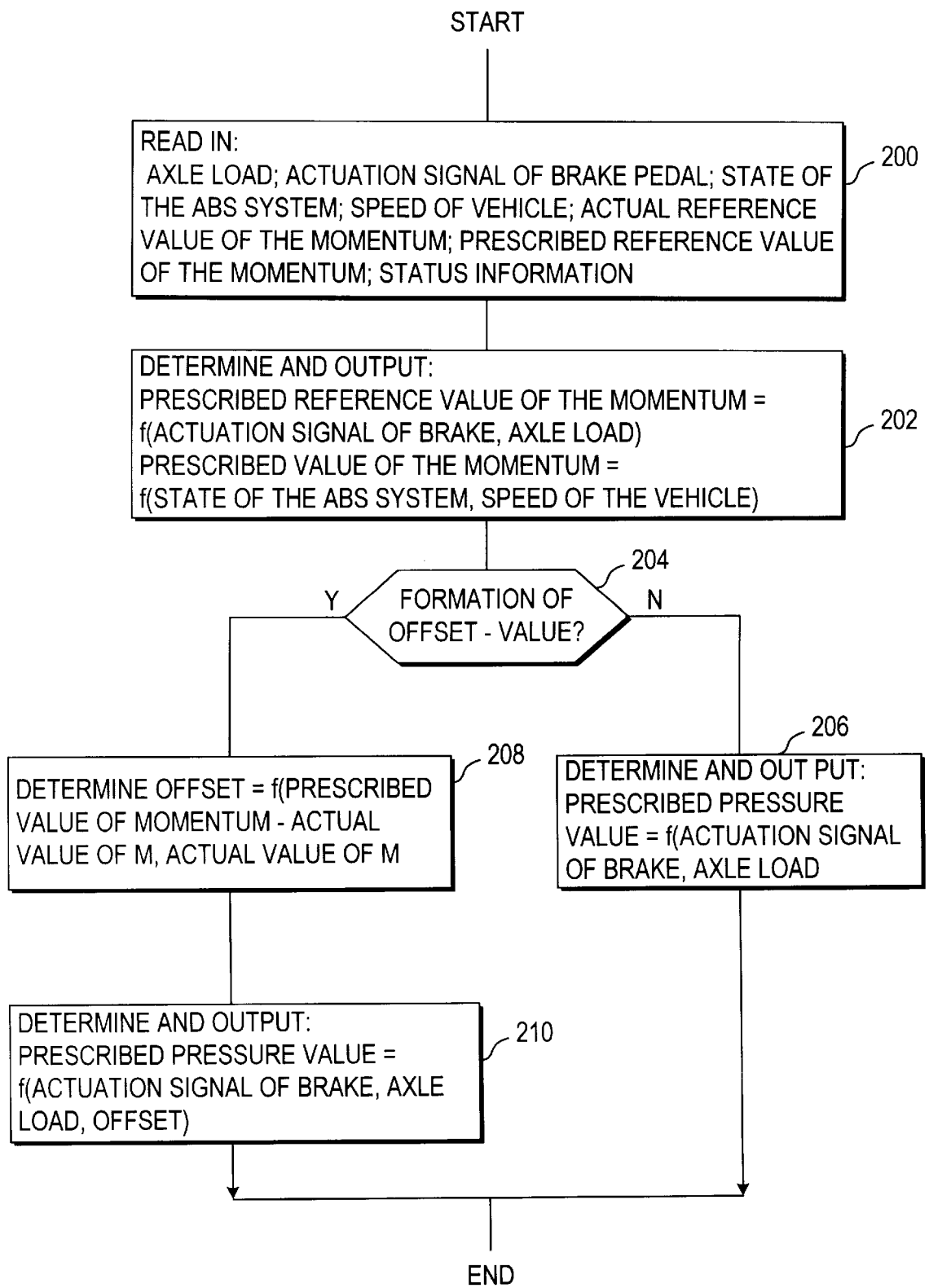
FIG. 3 shows a preferred embodiment in the form of a flow chart of a computer program.

In the preferred exemplary embodiment, control unit 10 comprises at least one microcomputer, which runs a program designed to execute the invention. FIG. 3 shows a flow chart, which illustrates this program.

After the subprogram starts at predetermined times (every 10–100 msec), the operating variables required to implement the invention are accepted as input in the first step 200. These variables are the axle load, the braking command BWG, the actual braking moment $M_{IstRet}$ in fact produced by the retarder, the desired braking moment $M_{SollRet}$ to be actualized by the retarder, the status information S of the retarder, information on the status of an antilock controller (whether activated or not), and the velocity of the vehicle. Then the desired braking moment $M_{Soll}$ to be produced by the retarder is determined in step 202 from predetermined characteristic curves or diagrams as a function of the braking command and the axle load; possibly the limit braking moment $M_{SollLimit}$ is also determined as a function of the status of the antilock controller and/or of the vehicle velocity. Both of these values are then transmitted to the retarder over the communications link. Next, the program asks in question step 204 whether release has been granted for the formation of offset values for controlling the duty brake of the vehicle. This is not the case when panic braking is occurring, when the retarder braking moment is limited, or when certain appropriate status information from the retarder has been received. In this case, the desired pressure value $P_{Soll}$ is determined in step 206 from the unmodified characteristic curve as a function of the braking command BWG and the axle load and transmitted to the control units for controlling the wheel brakes. Then the subprogram terminates and starts at the predetermined time. If according to step 204 it is permitted to form offset values, then in step 208 the offset values of the support points are determined from a characteristic curve or a table as a function of the actual moment of the-retarder and of the difference between the desired moment and the actual moment of the retarder, and the characteristic curve is modified accordingly. In the next step 210, the desired braking pressure values are calculated from the modified characteristic curve as a function of the braking command and the axle load and transmitted to the control units for controlling the wheel brakes. The subprogram also terminates after step 210 and is repeated at the predetermined time.

In the preferred exemplary embodiment, control unit 10 represents the control unit of an electrically controlled duty brake system. As a result of the invention, this control unit influences the adjustment of the retarder in an advantageous manner. Under normal operating conditions, i.e., when the control unit is transmitting a desired braking moment value, the driver can call for a greater braking action by actuating the manual retarder switch. If the braking moment desired by the driver is greater than the limit braking moment determined and transmitted by brake control unit 10, the braking action of the retarder is held to this limit value.

Figure 5:
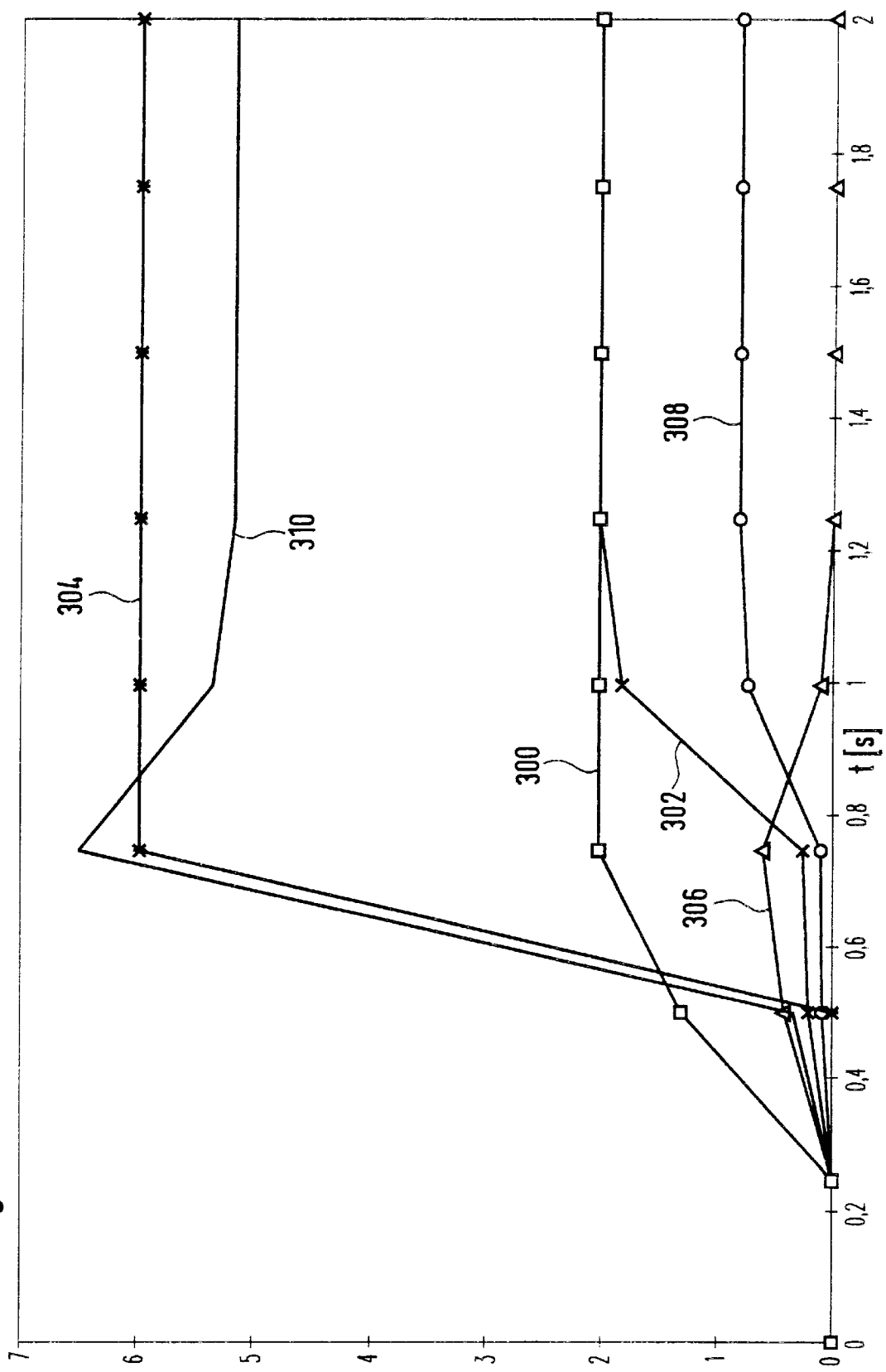
FIG. 5 shows the change over time in the braking moment of the duty brake and the retarder.

The way in which the invention works is illustrated on the basis of the time graph of FIG. 5. The example is based on a typical braking process. The time T is shown on the horizontal axis, the braking pressure at a selected wheel and the braking moment of the retarder on the vertical axis. At a time $T_0$, the driver actuates the brake pedal, so that braking action is built up. In FIG. 5, the desired braking moment 300 and the actual braking moment 302 are shown, these values being transmitted by the retarder control unit. It can be seen that the buildup of the braking moment in the retarder is delayed.

The dynamic part of the modification of the characteristic curve for the desired braking pressure values is a result of the difference $M_{SOLLRET} - M_{ISTRET}$ between the desired and the actual braking moments. As a result of this modification, a dynamic offset value 306 is obtained.

The static part of the modification of the characteristic curve for desired braking pressure values is a result of the actual braking moment $M_{SOLLRET}$. A static offset value 308 is obtained as a result of this modification. The static and the dynamic modifications of the characteristic are carried out in accordance with FIG. 3.

On the basis of the unmodified characteristic curve, a desired value to be produced for the duty brake would be obtained according to 304. As a result of the modified characteristic curve, the desired value to be reached for the duty brake takes the course according to 310.

What is claimed is:

1. Method for controlling the brake system of a vehicle having electronically controlled duty brake means and electronically controlled retarder means, said method comprising measuring a driver's command, determining a desired braking moment for said retarder means based on said driver's command, measuring an actual braking moment produced by said retarder means, determining a desired braking value for the duty brake means based on said actual braking moment and said driver's command, and adjusting the duty brake means based on said desired braking value.

2. Method as in claim 1 further comprising determining the difference between the desired braking moment and the actual braking moment, the desired braking value being based on said difference and said driver's command.

3. Method as in claim 1 further comprising measuring an axle load of the vehicle, said desired braking moment being determined based on said axle load and said driver's command.

4. Method as in claim 1 further comprising measuring an axle load of the vehicle, said desired braking value being determined based on said axle load, said actual braking moment, and said driver's command.

5. Method as in claim 1 wherein the desired braking value for the duty brake means is determined from a characteristic curve based on said driver's command, said actual braking moment being used to determine offset values for said characteristic diagram.

6. Method as in claim 5 further comprising measuring an axle load of the vehicle, said characteristic curve being based on said axle load and said driver's command.

7. Method as in claim 1 further comprising determining whether any of a plurality of operating situations is present, said situations comprising panic braking, limitation of the desired braking moment of the retarder means, and a defect in the retarder means, said desired braking value being based on said actual braking moment only when one of said operating situations is present.

8. Method as in claim 1 further comprising determining whether a plurality of operating situations is present, said operation situations comprising ABS operation and vehicle velocity in a specified range, and limiting said desired braking amount when at least one of said operating situations is present.

9. Method as in claim 1 wherein said desired braking value is one of brake force, brake power, and brake pressure.

10. Apparatus for controlling the brake system of a vehicle having electronically duty brake means and electronically controlled retarder means, said apparatus comprising means for measuring a driver's command, means for determining a desired braking moment for said retarder means based on said driver's command, means for measuring an actual braking moment produced by said retarder means, means for determining a desired braking value for the duty brake means based on said actual braking moment and said driver's command, and means for adjusting the duty brake means based on said desired braking value.

11. Apparatus as in claim 10 wherein said means for determining a desired braking moment for said retarder means comprises electronic control means which also determines limit values for said desired braking moment, receives a variable representing said actual braking moment produced by said retarder means, and determines said desired braking value for the duty brake.

12. A method for controlling the brake system of a vehicle having electronically controlled duty brake means and electronically controlled sustained action brakes, that method comprising:

measuring a driver's command;

determining a desired braking value for said sustained action brake based on said driver's command;

measuring an actual braking value produced by that sustained action brake;

determining a desired braking value for the duty brake means based on said driver's command and at least one of said actual braking value and a value formed from said desired braking value and said actual braking value;

determining a limit value for said desired braking value for said sustained action brake on the basis of at least one of the vehicle velocity, when at least one of an ABS-operation takes place and when the vehicle is travelling through a curve; and outputting at least one of said limit value and said desired braking value to a control unit of the sustained action brake in order to adjust the braking value according to at least one of said limit value and said desired braking value.

13. A method for controlling the brake system of a vehicle having electronically controlled duty brake means and electronically controlled sustained action brakes, said method comprising:

measuring a driver's command;

determining a desired braking value for said sustained action brake based on said driver's command;

measuring an actual braking value produced by that sustained action brake;

determining whether at least one operating situation is present, said situation comprising panic braking, limitation of the desired braking value for the sustained action brake, a defect in the sustained action brake; and determining a desired braking value for the duty brake means based on said driver's command and at least one of said actual braking value and a value formed from said desired braking value and said actual braking value, only when said operating situation is not present.

14. An apparatus for controlling the brake system of a vehicle having electronically controlled duty brake means and electronically controlled sustained action brakes, said apparatus comprising:

a means for measuring a driver's command;

a means for determining a desired braking value for said sustained action brake based on said driver's command;

a means for measuring an actual braking value produced by that sustained action brake;

a means for determining a desired braking value for the duty brake means based on said driver's command and at least one of said actual braking value and a value formed from said desired braking value and said actual braking value;

a means for determining a limit value for said desired braking value for said sustained action brake on the basis of at least one of the vehicle velocity, when at least one of an ABS-operation takes place and when the vehicle is travelling through a curve; and a means for outputting at least one of said limit value and said desired braking value to a control unit of the sustained action brake in order to adjust the braking value according to at least one of said limit value and said desired braking value.

15. An apparatus for controlling the brake system of a vehicle having electronically controlled duty brake means and electronically controlled sustained action brakes, said apparatus comprising:

a means for measuring a driver's command;

a means for determining a desired braking value for said sustained action brake based on said driver's command;

a means for measuring an actual braking value produced by that sustained action brake;

a means for determining whether at least one operating situation is present, said situation comprising panic braking, limitation of the desired braking value for the sustained action brake, a defect in the sustained action brake; and a means for determining a desired braking value for the duty brake means based on said driver's command and at least one of said actual braking value and a value formed from said desired braking value and said actual braking value, only when said operating situation is not present.

* * * * *